Feb. 28, 1928.
H. G. BAKER
1,660,907
COLLAPSIBLE TIRE RIM
Filed March 9, 1927
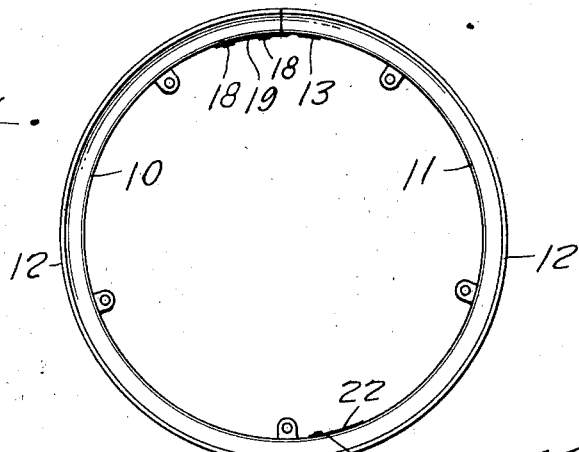
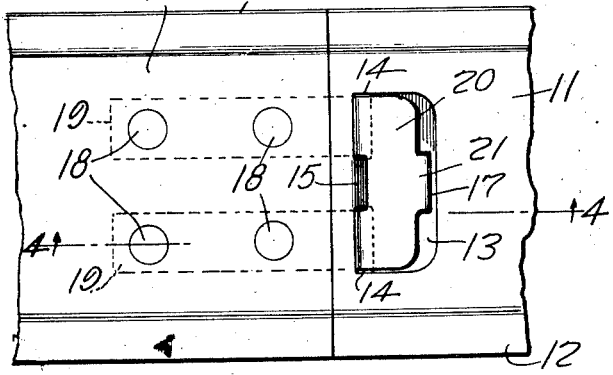
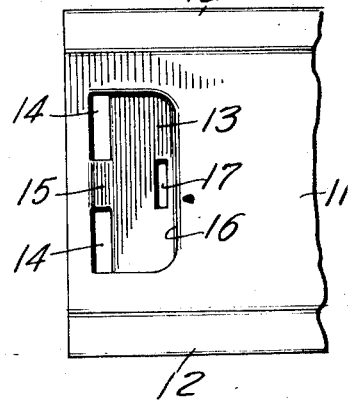
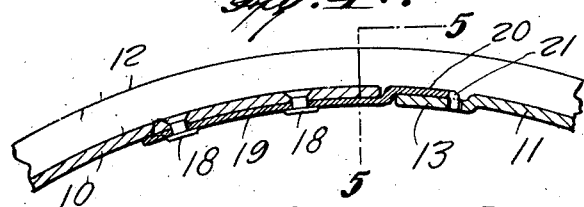
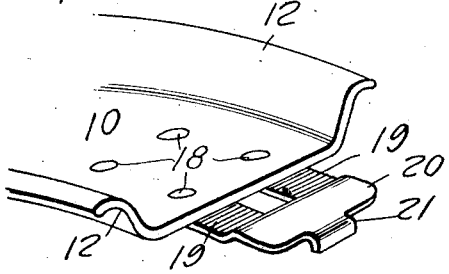
Inventor
HENRY G. BAKER,
By Thomas R. Harney
Attorney Patented Feb. 28, 1928.

1,660,907

UNITED STATES PATENT OFFICE.

HENRY G. BAKER, OF KANSAS CITY, MISSOURI, ASSIGNOR TO GEORGE B. ROONEY, OF FAIRVIEW, KANSAS.

COLLAPSIBLE TIRE RIM.

Application filed March 9, 1927. Serial No. 173,852.

My invention relates to tire carrying rims of the collapsible rim type wherein the body of the rim is formed of arcuate sections, with certain of the sections secured together in hinged relation to facilitate the mounting and dismounting of tires therefrom.

Objects which the present invention has in view are: to provide a collapsible tire rim having a novel structural arrangement of hinge joint between sections thereof; to provide in a collapsible rim having sections, means for retaining certain abutting ends of the sections in positive interlocked connection when the rim is in service position; to provide a tire rim of the character specified wherein certain of the rim sections are structurally arranged in permanently connected relation while at the same time being capable of relative movement; and generally to provide in a tire rim of the collapsible type, a novel interlocking hinged connection between sections thereof.

This specification, and the accompanying drawings, describe and illustrate but one practical, physical embodiment of the principles of the invention, and it will be understood that within the scope of the invention as claimed, many structural modifications may be effected without departing from the principles upon which the invention is based.

Throughout the drawings and specification like reference characters are employed to designate like elements of the structural details. In the drawings:—

Figure 1 is a side elevation of a rim constructed in accordance with the principles of the invention, and in service position.

Figure 2 is a fragmentary top plan view of the interlocking hinge joint connection between adjacent rim sections, as in service position.

Figure 3 is a plan view of one of the meeting ends of the rim sections shown in Figure 2.

Figure 4 is a vertical section taken on the line 4—4 of Figure 2.

Figure 5 is a vertical section, transversely of the rim, taken on the line 5—5 of Figure 4.

Figure 6 is a perspective view of one of the rim section ends as shown in Figure 2.

In detail, the rim is formed of a plurality of arcuate rim sections, in this instance two substantially semi-circular sections 10 and 11 respectively, each of which is formed in the conventional manner of such rims with upturned side flanges 12, between which and on the surface of the rim, is seated the casing and enclosed tube of a pneumatic tire of any desired type, and as the tire forms no part of the present invention, any showing thereof is omitted for clearness of detail relative to the rim construction.

Adjacent one end one of the rim sections, arbitrarily designated as the section 11, is formed with a countersunk portion 13 as best shown in Figure 3, which portion is substantially rectangular in configuration except that the inner corners thereof are rounded. The countersunk portion 13 is disposed with its greatest dimension transversely of the rim section and in its entirety is arranged equidistantly between the side flanges 12, being spaced slightly inwardly of the end of the rim section. The portion 13 is also provided with two side and end edge opening recesses cut therefrom which cooperate with the body of the rim section to form two rectangular slots 14, the inner side edges of which terminate in spaced relation leaving a web 15 of the rim material therebetween which connects the forward edge of the countersunk portion with the rim section body thereby greatly strengthening the rim structure at this point in addition to functioning as a guide, as will be hereinafter explained. Adjacent the inner end 16 of the portion 13, a rectangular slot 17 is formed through the material of the countersunk portion, and equidistantly between the side edges thereof, the length of the slot 17 being substantially equal the width of the web 15.

The adjacent or meeting end of the rim section 10 has secured to the under face thereof, as by the rivets 18, or other suitable fastening means, the parallel spaced arms 19 of a substantially U shaped connector in which the said arms 19 are made integral with a head 20 upturned from the ends of the arms to lie flush with the surface of the rim section 10 and in spaced relation from the end thereof, as best shown in Figure 6. This head 20 is of approximately the size and shape of the countersunk portion 13 of the adjacent rim section 11, being purposely so formed so that it may be seated therein when the rim sections are in assembled relation. A downturned lip 21 is formed on the head 20 for seating engagement in and through the slot 17 of the rim section 11.

In assembling the rim in its entirety, the arms 19 of the connector are first threaded through the slots 14 in the rim section 11 so that the head 20 is fully seated in the countersunk portion 13 thereof, with the lip or lug 21 engaged in the slot 17. In the operation of inserting the connector, the web 15 serves to guide the arms 19 into proper position. The abutting end of the rim section 10 is then seated over the arms 19 in desired service position, and the arms are attached to the section by the rivets 18 as shown. The two rim sections are thus connected in permanently attached relation, but the joint functions as a hinge to permit folding of the sections in the "breaking" of the rim, as the head 20 may be freely raised from its seat in the countersunk portion 13 in the operation.

In service, the opposite free ends of the rim sections are locked together by any suitable means as designated at 22, which is of the conventional structure in common use for the purpose and need not be described in detail.

In service position of the rim, with a tire mounted thereon, the surface of the head 20 seats fully within the depressed portion 13 and lies flush with the adjoining rim surfaces, forming a continuous bearing surface therewith for the tire. The engagement of the lip 21 in the slot 17 effectively prevents any lateral relative movement between the abutting ends of the rim sections at the joint, and thus eliminates danger of friction and undue wear on the tire casing at this point, besides serving as a means for checking any relative creeping movement between the sections longitudinally of the rim periphery. The provision of the web 15 materially reinforces the joint and prevents any distortion which may be caused at the forward end of the countersunk portion 13 by reason of its pulling away from the rim section body in the folding operation by which the rim is "broken." The rounded inner corners of the portion 13 and the head 20 provide for a ready seating engagement of the head within the countersunk portion, and enables a slight pivotal movement between the rim sections in a direction transverse the rim whenever such movement is required in aligning the free ends of the sections for locking with the member 22.

With the rim in assembled position each of the arms 19 in its engagement with the walls of the slots 14 functions to prevent lateral play between the rim sections on each side of the longitudinal center thereof, and as the lip 21 in slot 17 serves a similar function in said longitudinal center, the joint provides for a three point anchorage against undue side play, and at mutually spaced points.

I claim:—

1. A collapsible tire rim comprising rim sections arranged in end to end abutting relation, one of said sections being formed with a substantially rectangular shaped countersunk portion having spaced slots in the corners of the side adjacent the rim end which forms a transverse bridge portion therebetween, a U-shaped connector having a width slightly less than the transverse width of the countersink, the head of said connector being adapted to be seated entirely in said countersink and the arms of the connector extending through the countersunk slots straddling the bridge portion, and means for permanently securing the ends of the arms to the adjacent rim section.

2. A collapsible tire rim comprising rim sections arranged in end to end abutting relation, one of said sections being formed with a substantially rectangular shaped countersunk portion having spaced slots in the corners of the side adjacent the rim end which forms a transverse bridge portion therebetween, said countersink having a slot adjacent the outer side edge, a U-shaped connector having a width slightly less than the transverse width of the countersink, the head of said connector being adapted to be seated entirely in said countersink and the arms of the connector extending through the spaced countersunk slots and straddling the bridge portion, means for securing the ends of the arms to the adjacent rim section, and a lug on the connector head adapted for interlocking engagement with the outer countersunk slot.

In testimony whereof I have affixed my signature.

HENRY G. BAKER.